(12) United States Patent
Sasaki

(10) Patent No.: US 7,019,416 B2
(45) Date of Patent: Mar. 28, 2006

(54) POWER SOURCE CIRCUIT, ELECTRONIC DEVICE BEING EQUIPPED WITH SAME POWER SOURCE CIRCUIT AND CONTROL METHOD OF POWER SOURCE CIRCUIT

(75) Inventor: Hiroshi Sasaki, Miyagi (JP)

(73) Assignee: NEC Tokin Corporation, Miyagi (JP)

( * ) Notice: Subject to any disclaimer, the term of this patent is extended or adjusted under 35 U.S.C. 154(b) by 534 days.

(21) Appl. No.: 10/244,372

(22) Filed: Sep. 17, 2002

(65) Prior Publication Data

US 2003/0052645 A1 Mar. 20, 2003

(30) Foreign Application Priority Data

Sep. 18, 2001 (JP) .............................. 2001-284088

(51) Int. Cl.
*H02J 7/00* (2006.01)
(52) U.S. Cl. ........................... 307/43; 307/64; 307/70; 307/80; 307/81; 307/115; 320/122; 320/135; 320/166
(58) Field of Classification Search .................. 307/29, 307/43, 44, 65, 74, 81
See application file for complete search history.

(56) References Cited

U.S. PATENT DOCUMENTS 6,034,443 A * 3/2000 Oliemuller et al. ........... 307/70

| 6,153,949 A | 11/2000 | Soderhall |
| 6,201,371 B1* | 3/2001 | Kawabe et al. ............. 320/121 |
| 6,225,781 B1* | 5/2001 | Okamura et al. ........... 320/122 |

FOREIGN PATENT DOCUMENTS

JP 2000-346906 12/2000

OTHER PUBLICATIONS

European Serach Report dated Feb. 9, 2005.

* cited by examiner

*Primary Examiner*—Brian Sircus
*Assistant Examiner*—Hal Kaplan
(74) *Attorney, Agent, or Firm*—Whitham, Curtis, Christofferson & Cook P.C.

(57) ABSTRACT

A power source circuit capable of improving an efficiency of using energy of a chemical battery cell by responding suitably to an intermittent change in a load current, by during a load burst period in an odd-numbered order, a load is driven by power accumulated in a first power storing section and, during a load burst period in an even-numbered order, a load is driven by power accumulated in a second power storing section. The chemical battery cell does not discharge during the load burst period. Therefore, an amount of a voltage having dropped due to an internal impedance of a power supplying section becomes small and, as a result, when the power source circuit is applied to the electronic device which becomes inoperable due to a temporary voltage drop in the power source, an operational life of the power supplying section is made longer.

14 Claims, 7 Drawing Sheets

POWER SOURCE CIRCUIT, ELECTRONIC DEVICE BEING EQUIPPED WITH SAME POWER SOURCE CIRCUIT AND CONTROL METHOD OF POWER SOURCE CIRCUIT

BACKGROUND OF THE INVENTION

1. Field of the Invention

The present invention relates to a power source circuit, an electronic device being equipped with the power source circuit, and a method for controlling the power source circuit, and more particularly to the power source circuit being suitably used when supply power is fed to a load whose load current is intermittently changed such as a power source section of a power amplifier, for transmission of a radio wave, being embedded in a portable cellular phone, to the electronic device having the above power source circuit and to the method for controlling the power source circuit.

The present application claims priority of Japanese Patent Application No. 2001-284088 filed on Sep. 18, 2001, which is hereby incorporated by reference.

2. Description of the Related Art

In a power source circuit using a chemical battery cell, when a load whose load current is intermittently changed is connected thereto, since an internal impedance of the chemical battery cell is comparatively large, a phenomenon occurs in which a voltage drops instantaneously at a same time when an instantaneous increase occurs in a load current. To solve this problem, conventionally, a capacitor having a comparatively low impedance is connected, in parallel to, the chemical battery cell. As a result, even if a load in which a synthetic impedance being lower than an internal impedance of the chemical battery cell is formed is connected to the chemical battery cell, an instantaneous drop rate is lowered when compared with a case in which the same chemical battery cell is singly used.

The conventional power source circuit of this kind, as shown in FIG. 7, is provided with a chemical battery cell 1 and a capacitor 2 being connected in parallel to the chemical battery cell 1 and a load L is connected to both the chemical battery cell 1 and the capacitor 2. The chemical battery cell 1 is made up of a secondary battery cell such as a nickel cadmium cell, nickel hydrogen cell, lithium ion cell, or a like, or an alkaline primary battery cell and saves a specified amount of energy and generates an electromotive force (that is, a voltage) V1 to feed it to the load L. The chemical battery cell 1 has an internal impedance 1a. The capacitor 2 is made up of, for example, an electric double-layer capacitor and is charged at a voltage V1 of the chemical battery cell 1 to accumulate power and feeds the accumulated power to the load L. The capacitor 2 has an internal impedance 2a. The load L is, for example, a power amplifier, for emitting a transmission radio wave, embedded in a portable cellular phone in which a load current is changed intermittently and a pulse-like load current IL flows therein.

FIG. 8 is a timing chart of signals explaining operations of the conventional power source circuit of FIG. 7. A current and a voltage are plotted as the ordinate and time is plotted as the abscissa. Operations of the power source circuit shown in FIG. 7 are described by referring to FIG. 8. At a time t1, a load current IL increases instantaneously and the voltage V1 of the chemical battery cell 1 drops from a voltage value Va to a voltage value Vb. In this case, an internal impedance Z of the power source circuit is given by a following equation:

$$Z = R1 + R2/(R1+R2) \quad \text{Equation (1)}$$

where "R1" is a value of the internal impedance 1a and "R2" is a value of the internal impedance 2a. Thus, the internal impedance Z is smaller than the internal impedance 1a. A drop rate of a voltage value Vb is smaller compared with that of a voltage value Vc to be produced when the power source is made up of the chemical battery cell 1. At a time t2, the pulse-like load current IL decreases instantaneously and voltage V1 of the chemical battery cell 1 returns from the voltage value Vb to the voltage value Va. A voltage V2 of the capacitor 2 changes in the same manner as above.

Thus, when the capacitor 2 is connected in parallel to the chemical battery cell 1, since a drop rate of the voltage value Vb is small when compared with the voltage value Vc, if the chemical battery cell 1 is made up of the secondary battery cell, time being usable for every single charge cycle becomes longer when compared with a case in which the power source circuit is made up of only the chemical battery cell 1. Moreover, when the chemical battery cell 1 is made up of the alkaline primary battery cell having a comparatively high internal impedance, a life of the power source circuit becomes longer when compared with the case in which it is made up of only the chemical battery cell 1.

However, the conventional power source presents the following problems. That is, in an electronic device having the power source circuit shown in FIG. 7, whether a remaining capacity of the chemical battery cell 1 is sufficient or insufficient is judged based merely on a drop in the voltage V1 and, therefore, there occurs a case in which, even if an instantaneous drop of the voltage V1 occurs, the remaining capacity of the chemical battery cell 1 is judged to be insufficient. However, if the chemical battery cell 1 is made up of, for example, the alkaline primary battery cell, even if a remaining capacity of the chemical battery cell 1 is judged to be insufficient to operate a certain electric device, the same remaining capacity thereof may be judged to be sufficient to operate another certain electric device. This phenomenon indicates that capacitance of the chemical battery cell 1 has not yet been completely exhausted. That is, the chemical battery cell 1 is judged to be at an end of its life in a state in which discharging depth (that is, a ration of already-discharged capacity to a rated capacitance) of the chemical battery cell 1 is small, which, as a result, presents a problem in that an efficiency of using energy of the chemical battery cell 1 is lowered. Moreover, when the chemical battery cell 1 is made up of, for example, the secondary battery cell, nickel cadmium cell, nickel hydrogen cell, lithium ion cell, or the like, if the chemical battery cell 1 has not run out of its capacitance, time being usable for every singly charge cycle become extremely shorter than time usable in an original cell capacitance. Furthermore, there is a problem in that voltage of the capacitor 2 may be unable to respond to an intermittent change in the load current IL, depending on a capacitance of capacitor 2.

SUMMARY OF THE INVENTION

In view of the above, it is an object of the present invention to provide a power source circuit which is capable of improving an efficiency of using energy of a chemical battery cell, of lengthening its usable time and of responding to an intermittent change in a load current, an electronic device being equipped with the above power source circuit, and a method of controlling the power source circuit.

According to a first aspect of the present invention, there is provided a power source circuit for supplying power to a load in which a load burst period intermittently occurs during which a load current increases and decreases in a burst manner including:

a power supplying section to generate an electromotive force and to feed it to the load;

a plurality of power storing sections to be charged by an electromotive force fed from the power supplying section and to accumulate power; and a control section to select, for every load burst period, an arbitrary one of the power storing sections that have been already charged and to feed only power that has been accumulated in the selected power storing section during the load burst period to the load and to charge a power storing section that has not yet been charged.

According to a second aspect of the present invention, there is provided a power source circuit for supplying power to a load in which a load burst period intermittently occurs during which a load current increases and decreases in a burst manner including:

a power supplying section to generate an electromotive force and to feed it to the load;

a first power storing section to be charged by an electromotive force fed from the power supplying section and to accumulate power;

a second power storing section to be charged by an electromotive force fed from the power supplying section and to accumulate power; and a control section to feed only power accumulated in the first power storing section during a load burst period in an odd-numbered order out of the load burst periods to the load and to feed only power accumulated in the second power storing section during a load burst period in an even-numbered order out of the load burst periods.

In the foregoing, a preferable mode is one wherein the control section includes:

a load state monitoring section to monitor a load current flowing through the load and to output, based on a result from the monitoring, a signal representing information about occurrence of a load burst period showing production of the load burst period;

a power storing section monitoring circuit to monitor a voltage of the first power storing section and a voltage of the second power storing section and to output, based on a result from the monitoring, a signal representing information about charging and discharging showing a state of charging and discharging in the first power storing section and the second power storing section; and a power supply controlling circuit to input the information about occurrence of a load burst period and information about a state of charging and discharging and, to feed, during the load burst period in the odd-numbered order out of the load burst periods, only power accumulated in the first power storing section that has been already charged to the load and to charge the second power storing section that has not been charged and to feed, during the load burst period in the even-numbered order out of the load burst periods, only power accumulated in the second power storing section that has been charged to the load and to charge the first power storing section that has not been charged.

Also, a preferable mode is one wherein each of the first and second power storing sections has at least capacity capable of feeding required power to the load during one load burst period.

Also, a preferable mode is one wherein the power supplying section is made up of a chemical battery cell or a direct current power source whose maximum output current is limited to a specified current level and wherein each of the first and second power storing sections is made up of an electric double-layer capacitor or a secondary battery cell.

According to a third aspect of the present invention, there is provided a method for controlling a power source circuit for supplying power to a load in which a load burst period intermittently occurs during which a load current increases and decreases in a burst manner, the method including:

a step of placing a power supplying section to generate an electromotive force and to feed it to a load, a first power storing section to be charged by an electromotive force generated by the power supplying section, and to accumulate power and to feed the accumulated power to the load, and a second power storing section to be charged by an electromotive force generated by the power supplying section, and to accumulate power and to feed the accumulated power to the load; and a step of feeding, when a load burst period during which a load current flowing through the load increases intermittently occurs, only power accumulated in the first power storing section to the load during a load burst period in an odd-numbered order out of the load burst periods and only power accumulated in the second power storing section to the load during a load burst period in an even-numbered order out of the load burst periods.

According to a fourth aspect of the present invention, there is provided a method for controlling a power source circuit for supplying power to a load in which a load burst period intermittently occurs during which a load current increases and decreases in a burst manner, the method including:

a process of placing a power supplying section to generate an electromotive force and to accumulate power and to feed it to a load, a first power storing section to be charged by an electromotive force fed from the power supplying section, to accumulate power and to feed the accumulated power supplied by the power supplying section to the load, and a second power storing section to be charged by an electromotive force supplied by the power supplying section and to accumulate power, and to feed the accumulated power to the load;

a process of monitoring a load state to monitor a load current flowing through the load and to output, based on a result from the monitoring, a signal representing information about occurrence of the load burst period showing production of the load burst period;

a process of monitoring a power storing section to monitor a voltage of the first power storing section and a voltage of the second power storing section and to output, based on a result from the monitoring, a signal representing information about charging and discharging showing a state of charging and discharging in the first power storing section and the second power storing section;

a first process of supplying power to input the information about occurrence of the load burst period and information about a state of charging and discharging and to feed, during a load burst period in an odd-numbered order out of the load burst periods, only power accumulated in the first power storing section that has been already charged to the load and to charge the second power storing section that has not been charged; and a second process of supplying power to feed, during a load burst period in an even-numbered order out of the load burst periods, only power accumulated in the second power storing section that has been charged to the load and to charge the first power storing section that has not been charged.

According to a fifth aspect of the present invention, there is provided an electronic device being equipped with a power source circuit for supplying power to a load in which a load burst period intermittently occurs during which a load current increases and decreases in a burst manner, the power source circuit including:

a power supplying section to generate an electromotive force and to feed it to the load;

a plurality of power storing sections to be charged by the electromotive force fed from the power supplying section and to accumulate power; and a control section to select, for every the load burst period, an arbitrary one of the power storing sections that have been already charged and to feed only power that has been accumulated in the selected power storing section during the load burst period to the load and to charge a power storing section that has not yet been charged.

In the foregoing fifth aspect, a preferable mode is one that wherein relates to a portable cellular phone.

Another preferable mode is one that wherein relates to a digital still camera.

According to a sixth aspect of the present invention, there is provided an electronic device being equipped with a power source circuit for supplying power to a load in which a load burst period intermittently occurs during which a load current increases and decreases in a burst manner, the power source circuit including:

a power supplying section to generate an electromotive force and to feed it to the load;

a first power storing sections to be charged by an electromotive force fed from the power supplying section and to accumulate power;

a second power storing sections to be charged by an electromotive force fed from the power supplying section and to accumulate power; and a control section to feed only power accumulated in the first power storing section during a load burst period in an odd-numbered order out of the load burst periods to the load and to feed only power accumulated in the second power storing section during a load burst period in an even-numbered order out of the load burst periods.

In the foregoing sixth aspect, a preferable mode is one that wherein relates to a portable cellular phone.

Another preferable mode is one that wherein relates to a digital still camera.

With the above configurations, since, during a load burst period existing in an odd-numbered order, a load is driven by power accumulated in a first power storing section and, during a load burst period existing in an even-numbered order, a load is driven by power accumulated in a second power storing section, even if a duty ratio of the load burst period in one period during which the load burst period occurs intermittently exceeds 50%, energy required during the load burst period is fed from the first power storing section or from the second power storing section and a chemical battery cell does not discharge during the load burst period. Therefore, an amount of a voltage having dropped due to an internal impedance of a power supplying section becomes small and, as a result, when the above-mentioned power source circuit is applied to the electronic device which becomes inoperable due to a temporary voltage drop in the power source, an operational life of the power supplying section is made longer.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
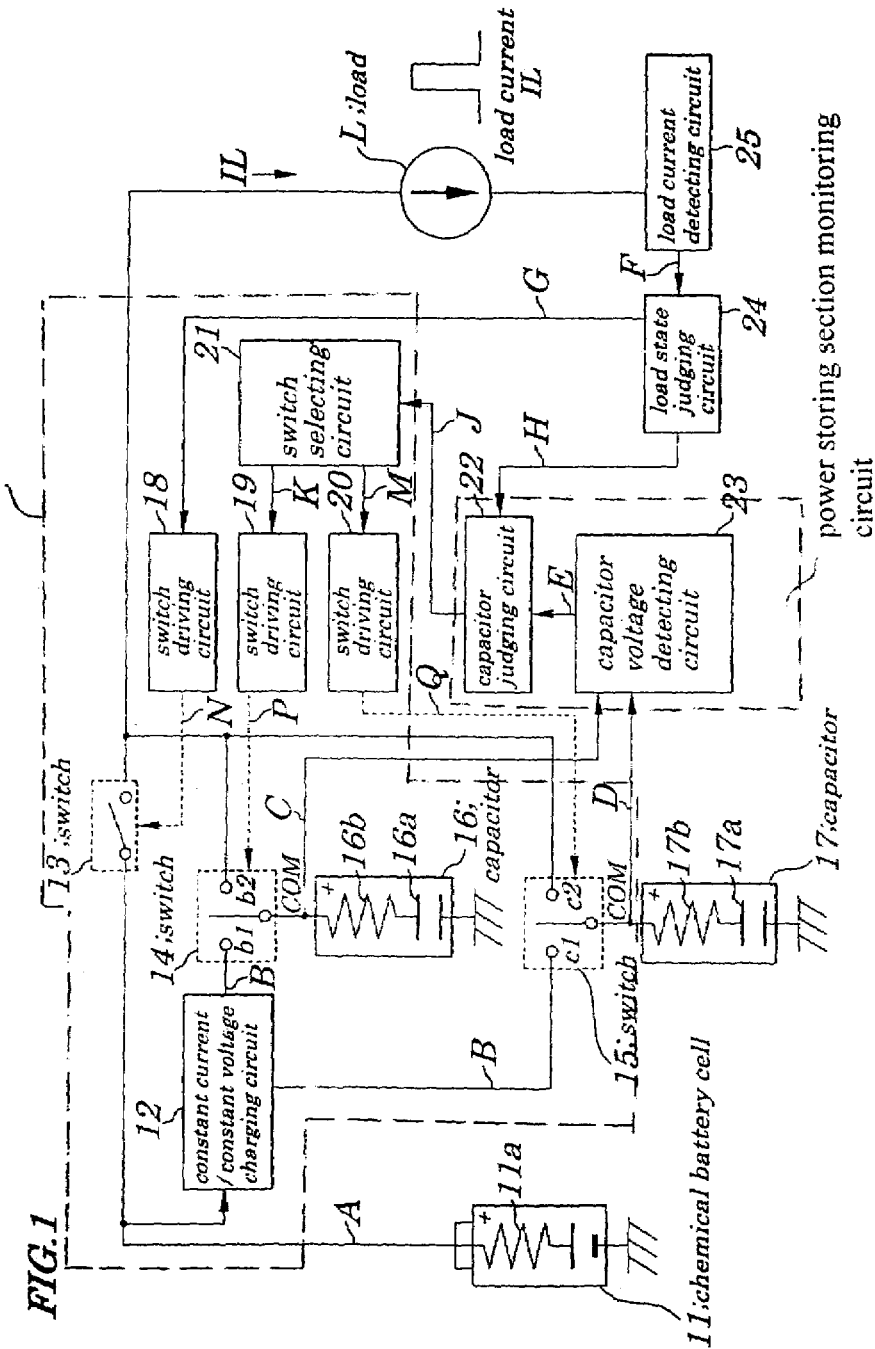
FIG. 1 is a schematic block diagram showing electrical configurations of a power source circuit according to a first embodiment of the present invention.

FIG. 1 is a block diagram showing electrical configurations of a power source circuit according to a first embodiment of the present invention. The power source circuit of the first embodiment, as shown in FIG. 1, includes a chemical battery cell 11, a constant current/constant voltage charging circuit 12, a switch 13, a switch 14, a switch 15, a capacitor 16, a capacitor 17, a switch driving circuit 18, a switch driving circuit 19, a switch driving circuit 20, a switch selecting circuit 21, a capacitor judging circuit 22, a capacitor voltage detecting circuit 23, a load state judging circuit 24, and a load current detecting circuit 25. A load L is connected to an output side of the power source circuit.

The chemical battery cell 11 is made up of a secondary battery cell such as a nickel cadmium cell, nickel hydrogen cell, lithium ion cell, or a like, or a primary battery cell such as an alkaline dry cell, manganese dry cell, lithium cell, or a like and generates an electromotive force by an electric chemical reaction and has a specified internal impedance (equivalent serial resistance) 11$a$. The constant current/constant voltage charging circuit 12 is made up of a constant current circuit (not shown) and a constant voltage circuit (not shown) both of which are serially connected to each other and a voltage detecting circuit (not shown), which feeds a current limited by the constant current circuit so as to have a specified current value B through the constant voltage circuit from the chemical battery cell 11 to each of the capacitor 16 and the capacitor 17 and then detects voltage values C and D of the capacitors 16 and 17 respectively, and continues charging until the voltage values C and D reach a specified voltage level.

The switch 13 is made up of, for example, an electromagnetic relay, an FET (Field Effect Transistor), or a like and is ON/OFF controlled, based a driving signal N. The switch 14 is made up of, for example, an electromagnetic relay, an FET, or a like and controls a state of connection among a COM (common) terminal, contact points b1 and b2, based on a driving signal P. The switch 15 is made up of, for example, an electromagnetic relay, an FET, or a like and controls a state of connection among a COM (common) terminal, contact points c1 and c2, based on a driving signal Q. The capacitor 16 is made up of an electric double-layer capacitor or a like and has an electrostatic capacitance 16a and an internal impedance 16b sufficient to drive the load L. The capacitor 17 is also made up of an electric double-layer capacitor or a like having same electric characteristics as electric double-layer capacitor or a like making up the capacitor 16 have, and has an electrostatic capacitance 17a and an internal impedance 17b sufficient to drive the load L. The characteristic values of the electrostatic capacitance 16a and 17a are preferably as large as possible while the characteristic values of the internal impedance 16b and 17b are preferably as small as possible. Moreover, these capacitors 16 and 17 are preferably small-sized and light-weight.

The switch driving circuit 18, if the switch 13 is made up of an FET, includes, for example, a CMOS (Complementary Metal Oxide Semiconductor)—structures driving circuit and, if the switch 13 is made up of an electromagnetic relay, includes, for example, a power transistor to control a coil current of the electromagnetic relay, and receives a control signal G transmitted from the load state judging circuit 24 and feeds the driving signal N to the switch 13. The switch driving circuit 19, as in the case of the switch driving circuit 18, is made up of a CMOS-structured driving circuit, power transistor, or a like, and receives a control signal K from the switch selecting circuit 21 and transmits the driving signal P to the switch 14. The switch driving circuit 20, as in the case of the switch driving circuit 18, is made up of a CMOS-structured driving circuit, power transistor, or a like and receives a control signal M transmitted from the switch selecting circuit 21 and transmits the driving signal Q to the switch 15. The switch selecting circuit 21 receives a control signal J transmitted from the capacitor judging circuit 22 and selects either of the switch 14 or the switch 15 and then outputs the control signal K or the control signal M. The constant current/constant voltage charging circuit 12, the switch 13, the switch 14, the switch 15, the switch driving circuit 18, the switch driving circuit 19, the switch driving circuit 20, and the switch selecting circuit 21 make up a power supply control circuit.

The capacitor judging circuit 22 receives a control signal E transmitted from the capacitor voltage detecting circuit 23 and a control signal H transmitted from the load state judging circuit 24 and then judges which one of the capacitor 16 or the capacitor 17 is connected to the load L according to a state of the load L and outputs the control signal J (information about a state of charging and discharging in the capacitors 16 and 17). The capacitor voltage detecting circuit 93 is made up of, for example, a voltage detecting circuit (not shown) and a voltage comparison circuit (not shown) using an operational amplifier (not shown) and detects a voltage value C of the capacitor 16 and a voltage value D of the capacitor 17 and then transmits a signal representing a result from the comparison between the voltage values C and D to the capacitor judging circuit 22 as the control signal F (information about states of charging and discharging) The capacitor judging circuit 22 and the capacitor voltage detecting circuit 23 make up a power storing section monitoring circuit.

The load state judging circuit 24 is made up of, for example, a comparison circuit or a like using a specified value of a load current IL as a reference value and receives a control signal F transmitted from the load current detecting circuit 25 and performs a judgment on a connection state in the switch 13 and transmits the control signal G (information about occurrence of a load burst period) to the switch driving circuit 18 and, at the same time, transmits the control signal H to the capacitor judging circuit 22.

The load current detecting circuit 25 is made up of, for example, a current detecting device (not shown) such as a current detecting resistor, current voltage converting circuit, or a like and detects the load current IL to monitor a state of the load L and outputs a signal indicating a result from the monitoring as the control signal F. The load state judging circuit 24 and load current detecting circuit 25 make up a load state monitoring circuit. The load L includes a power source section of a power amplifier used for emitting a transmission radio wave in which a load current is intermittently changed and in which a period (load burst period) during which a large amount of the load current IL flows and a period during which a small amount of the load current IL flows periodically occur. In the embodiment, especially, a rate occupied by the period during which a large amount of the load current IL flows, is longer than the period during which a small amount of the load current IL flows and an on-duty ration is about 67%.

Figure 2:
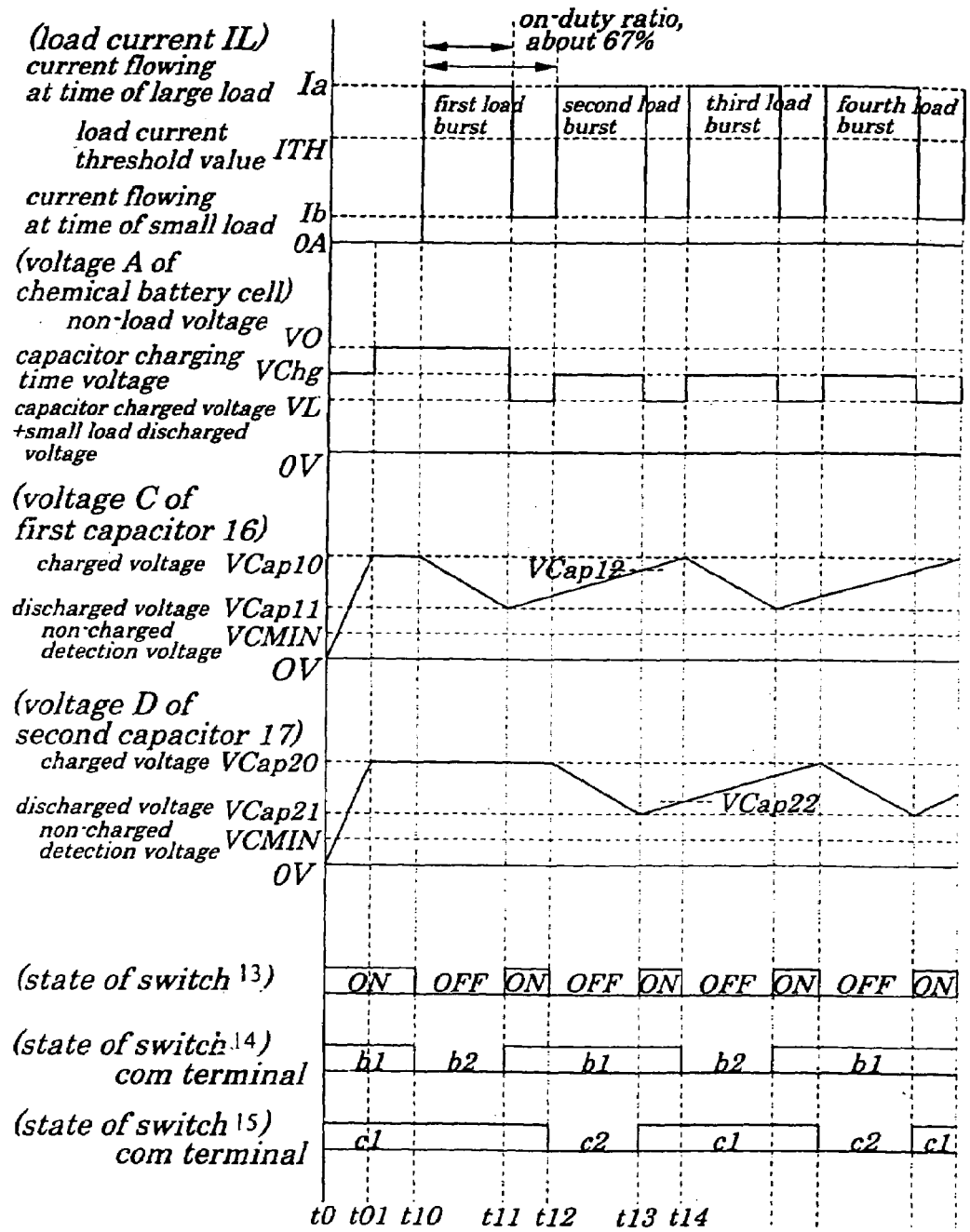
FIG. 2 is a timing chart explaining operations of the power source circuit in FIG. 1.

FIG. 2 is a timing chart of signals explaining operations of the power source circuit in FIG. 1. In FIG. 2, currents, voltages, or states of the switch 13, the switch 14, and the switch 15 are plotted as the ordinate and time is plotted as the abscissa. By referring to FIG. 2, methods (1) to (7) for controlling the power source circuit of the embodiment will be described below.

(1) Control Method at Time t0

At the time t0, the chemical battery cell 11 is in a state in which charging energy is stored and the capacitors 16 and 17 are in a state in which they are not charged and the load L is not driven. In this state, the load current detecting circuit 25 finds that the load current IL is less than a load current threshold value ITH and the control signal F is transmitted to the load state judging circuit 24. When the load current IL is less than the load current threshold value ITH, the control signal G to put the switch 13 in an ON state is transmitted from the load state judging circuit 24 to the switch driving circuit 18. This causes the switch driving circuit 18 to output an active mode driving signal N to put the switch 13 in the ON state. When the capacitor 16 is in a non-charged state, the capacitor voltage detecting circuit 23 finds that the voltage value C of the capacitor 16 is less than a non-charge judging voltage value VCMIN, which causes the capacitor detecting circuit 23 to transmit the control signal E to the capacitor judging circuit 22. When the voltage value C is less than the non-charge judging voltage value VCMIN, after the control signal J has been transmitted from the capacitor judging circuit 22 to the switch selecting circuit 21, the control signal K is transmitted from the switch selecting circuit 21 to the switch driving circuit 19. This causes the switch driving circuit 19 to output an active mode driving signal P to put the COM terminal and the contact b1 of the switch 14 in on ON state.

While the capacitor 17 is in a non-charged state and if the capacitor voltage detecting circuit 23 finds that the voltage value D of the capacitor 17 is less than the non-charge judging voltage value VCMIN, the control signal E is transmitted to the capacitor judging circuit 22. When the voltage value D is less than the non-charge judging voltage value VCMIN, after the control signal J has been transmitted from the capacitor judging circuit 22 to the switch selecting circuit 21, the control signal M is transmitted from the switch selecting circuit 21 to the switch driving circuit 20. This causes the switch driving circuit 20 to output an active mode driving signal Q to put the COM terminal and the contact c1 of the switch 15 in an ON state.

By the above operations, connection is established among the switch 13, the switch 14, and the switch 15. That is, according to a state of the switch 13, the load L is connected o the chemical battery cell 11. According to a state of the switch 14, the capacitor 16 is charged at a specified value B of a current fed from the chemical battery cell 11 through the constant current/constant voltage charging circuit 12. According to a state of the switch 15, the capacitor 17 is charged at a specified value B of a current fed from the chemical battery cell 11 through the constant current/constant voltage charging circuit 12. At this point, since the chemical battery cell 11 is discharged at a specified current value in order to charge the capacitors 16 and 17, the voltage value A of the chemical battery cell 1 drops due to the specified internal impedance 11a therein and is changed to be a capacitor charging time voltage Vchg which is smaller than no load voltage V0. In the capacitors 16 and 17, charging is initiated by the chemical battery cell 11 to raise terminal voltage values C and D.

(2) Control Method at Time t01

At the time t01, the chemical battery cell 11 is in a state in which charging energy is accumulated, the capacitors 16 and 17 are in a state in which they are charged so as to have a specified voltage level (that is, the charging has been completed), and the load L is not driven. After the state occurring at this time t01 has continued and when the capacitor 16 has been charged so as to have a specified voltage value VCap10 and the capacitor 17 has been charged so as to have a specified voltage value VCap20, the voltage values VCap10 and VCap20 are detected by the constant current/constant voltage charging circuit 12, thereby causing the charging to be stopped.

(3) Control Method at Time t10

At the time t10, the chemical battery cell 11 is in a state in which charging energy is accumulated, the capacitors 16 and 17 are in a state in which they have been charged so as to have a specified voltage level (that is, in a state in which the charging has been completed), and the load L is in a state in which its first burst has started. When the load L starts its first load burst, the load current detecting circuit 25 finds that the load current IL is more than a load current threshold value ITH (by a process of monitoring a load state) and, as a result, the control signal F is transmitted to the load state judging circuit 24. When the load current IL is more than the load current threshold value ITH, the control signal G used to put the switch 13 in an OFF state is transmitted from the load state judging circuit 24 to the switch driving circuit 18. This causes the switch driving circuit 18 to output an active mode driving signal N and, as a result, the switch 13 is put into an OFF state.

After the charging of the capacitors 16 and 17 has been completed, the voltages values C and D of the capacitors 16 and 17 are respectively compared by the capacitor voltage detecting circuit 23 and a signal indicating a result from the comparison is transmitted as the control signal E (as a process of monitoring a power storing section). At this time t10, for example, if the voltage value C of the capacitor 16 is judged by the capacitor voltage detecting circuit 23 to be higher than the voltage value D of the capacitor 17, the control signal E is transmitted to the capacitor judging circuit 22. Moreover, if the load current IL is judged to be more than the load current threshold value ITH by the load state judging circuit 24, the control signal H is transmitted to the capacitor judging circuit 22. The capacitor judging circuit 22 generates the control signal J based on the control signals E and H and transmits the produced signal J to the switch selecting circuit 21.

The control signal K is transmitted based on the control signal J from the switch selecting circuit 21 to the switch driving circuit 19 and then a non-active mode driving signal P is output from the switch driving circuit 19, thereby causing the COM terminal and contact b2 in the switch 14 to be put in an ON state. Moreover, the control signal M is transmitted, based on the control signal J, from the switch selecting circuit 21 to the switch driving circuit 20 and an active mode driving signal Q is output from the switch driving circuit 20, thereby causing the COM terminal and contact c1 in the switch 15 to be kept in an ON state.

By the above operations, connection is established among the switches 13, 14, and 15. That is, according to a state of the switch 13, the connection between the chemical battery cell 11 and the load L is cut off. According to a state of the switch 14, the capacitor 16 is connected to the load L. According to a state of the switch 15, the capacitor 17 keeps connection with the chemical battery cell 11 through the constant current/constant voltage charging circuit 12. Since the chemical battery cell 11, due to its disconnection to the load L and due to completion of the charging of the capacitor 17, is in a non-load state, its voltage A becomes a no load voltage V0. The capacitor 16, due to its connection to the load L, starts a supply of electric energy to the load L. The capacitor 17 is in a state in which its charging has been completed and in which its electrical state is stable (that is, by a first process of supplying power).

(4) Control Method at Time t11

At the time t11, the chemical battery cell 11 is in a state in which charging energy is accumulated, the capacitor 16 is in a state in which a supply of energy to the load burst has been completed, the capacitor 17 is in a state in which it has been charged so as to have a specified voltage value (that is, in a state of completion of charging), and the load L is in a state in which the first load burst has been completed. When the load L has completed its first load burst, the load current detecting circuit 25 finds that the load current IL is less than the load current threshold value ITH and the control signal F is transmitted to the load state judging circuit 24. The load state judging circuit 24 judges a state of the load current IL based on the control signal F. If the load current IL is less than the load current threshold value ITH, the control signal G used to put the switch 13 into an ON state is transmitted from the load state judging circuit 24 to the switch driving circuit 18. This causes the switch driving circuit 18 to output an active mode driving signal N and the switch 13 to be turned ON.

The capacitor 16, due to a supply of electric energy for the first load burst, is in a discharged state and its voltage has dropped from charged voltage VCap10 to discharged voltage VCap11 as shown in FIG. 2. The discharged voltage VCap11 of the capacitor 16 is compared with the charged voltage VCap20 of the capacitor 17 being in a charged state by the capacitor voltage detecting circuit 23 and a signal indicating a result from the comparison is transmitted to the capacitor judging circuit 22 as the control signal E. At the time t11, for example, if the capacitor voltage detecting circuit 23 finds that the voltage value C of the capacitor 16 is less than the voltage value D of the capacitor 17, the control signal E is transmitted to the capacitor judging circuit 22. Moreover, if the load state judging circuit 24 finds that the load current IL is less than the load current threshold value ITH, the control signal H is transmitted to the capacitor judging circuit 22. The capacitor judging circuit 22 generates the control signal J based on the control signals E and H and feeds it to the switch selecting circuit 21.

Based on the control signal J, the control signal K is transmitted from the switch selecting circuit 21 to the switch driving circuit 19 from which the active mode driving signal P is output, thus causing the COM terminal and contact b1 of the switch 14 to be put into an ON state. Moreover, based on the control signal J, the control signal M is transmitted from the switch selecting circuit 21 to the switch driving circuit 20 from which the active mode driving signal Q is output, thus causing the COM terminal and contact c1 of the switch 15 to be kept in an ON state.

By the above operations, connection is established among the switches 13, 14, and 15. That is, according to a state of the switch 13, the load L is connected to the chemical battery cell 11. According to a state of the switch 14, the capacitor 16 is charged at a specified value of a current fed from the chemical battery cell 11 through the constant current/constant voltage charging circuit 12. According to a state of the switch 15, the capacitor 17 is kept in a state in which it is still connected to the chemical battery cell 11 through the constant current/constant voltage charging circuit 12. Since the chemical battery cell 11 feeds energy required to drive a small load whose load current IL is less than the load current threshold value ITH to the load L and, at the same time, is discharged at a specified current value to re-charge the capacitor 16, the voltage value A of the chemical battery cell 11 drops, due to an internal impedance in the chemical battery cell 11, from its non-load voltage V0 to a voltage VL (a voltage value VL added a capacitor charged voltage value and a small load discharged voltage value). The capacitor 16 starts to be re-charged by the chemical battery cell 11, causing an increase in the voltage value C of the capacitor. The capacitor 17 is kept in a state in which charging has been completed and in an electrically stable state.

(5) Control Method at Time t12

At the time t12, the chemical battery cell 11 is in a state in which charging energy is accumulated, the capacitor 16 is in a state in which it is in a middle course of being charged, the capacitor 17 is in a state in which it is charged so as to have a specified voltage value (in a state in which the charging has been completed), and the load L has started a second load burst. When the load L starts the second load burst, the load current detecting circuit 25 finds that the load current IL is more than the load current threshold value ITH and the control signal F is transmitted to the load state judging circuit 24. The load state judging circuit 24 judges a state of the load current IL based on the control signal F. Then, if the load current IL is more than the load current threshold value ITH, the control signal G used to put the switch 13 in an OFF state is transmitted from the load state judging circuit 24 to the switch driving circuit 18. This causes the switch 13 to be put into an OFF state.

The capacitor 16 is in a middle course of being charged at a specified value of a current fed through the constant current/constant voltage charging circuit 12 from the chemical battery cell 11. The capacitor 17 is in a state in which charging has been completed. The voltage value C of the capacitor 16 is compared with the voltage value D of the capacitor 17 by the capacitor voltage detecting circuit 23 and a signal indicating a result from the comparison is transmitted to the capacitor judging circuit 22 as the control signal E. At this time t12, for example, if the capacitor voltage detecting circuit 23 finds that the voltage value C of the capacitor 16 is smaller than that of the capacitor 17, the control signal E is transmitted to the capacitor judging circuit 22. Moreover, if the load state judging circuit 24 finds that the load current IL is more than the load current threshold value ITH, the control signal H is transmitted to the capacitor judging circuit 22. The capacitor judging circuit 22, based on the control signal E and the control signal H, generates the control signal J and feeds it to the switch selecting circuit 21.

Based on the control signal J, the control signal K is transmitted from the switch selecting circuit 21 to the switch driving circuit 19 from which the driving signal P is output, which causes the COM terminal and contact b1 of the switch 14 to be kept in an ON state. Moreover, based on the control signal J, the control signal M is transmitted from the switch selecting circuit 21 to the switch driving circuit 20 from which a non-active mode driving signal Q is output, which causes the COM terminal and contact c2 of the switch 15 to be put in an ON state.

By the above operations, connection is established among the switches 13, 14, and 15. That is, according to a state of the switch 13, connection between the chemical battery cell 11 and the load L is cut off. According to a state of the switch 14, the capacitor 16 is charged at a specified value of a current fed from the chemical battery cell 11 through the constant current/constant voltage charging circuit 12. According to a state of the switch 15, the capacitor 17 is connected to the load L. Since the chemical battery cell 11 is not connected to the load L and since the capacitor 16 is in a middle course of being charged, the voltage value A of the chemical battery cell 11 drops due to the specified internal impedance 11a therein and is changed to be a capacitor charging time voltage VChg occurred by a voltage drop from non-load voltage V0. The capacitor 16 is in a middle course of being charged and therefore its terminal voltage value C is increasing. The capacitor 17, since it is connected to the load L, starts a supply of energy to the load L (that is, by a second process of supplying power).

(6) Control Method at Time t13

At the time t13, the chemical battery cell 11 is in a state in which charging energy is stored, the capacitor 17 is in a state in which a supply of electric energy to a second load burst has been completed, the capacitor 16 is in a middle course of being charged, and the load L is in a state in which its second load burst has terminated. When the load L has terminated the second load burst, the load current detecting circuit 25 finds that the load current IL is less than the load current threshold value ITH and the control signal F is transmitted to the load state judging circuit 24. In the load state judging circuit 24, a state of the load current IL is judged based on the control signal F. If the load current IL is less than the load current threshold value ITH, the control signal G to put the switch 13 into an ON state is transmitted from the load state judging circuit 24 to the switch driving circuit 18. This causes the switch driving circuit 18 to output an active mode driving signal N, thus causing the switch 13 to be put into an ON state.

The capacitor 17 is in a state in which it is discharged by a supply of energy to initiate the second load burst and therefore the voltage of the capacitor 17 drops from the charged voltage VCap20 to the discharged voltage VCap21. The discharged voltage VCap21 is compared with the voltage VCap12 (which is an intermediated voltage between the charged voltage VCap10 and the discharged voltage VCap11) of the capacitor 16 being in a middle course of being charged by the capacitor voltage detecting circuit 23 and a result from the comparison is transmitted as the control signal E to the capacitor judging circuit 22. At the time t13, for example, in the capacitor voltage detecting circuit 23, the voltage value D of the capacitor 17 is judged to be smaller than that of the capacitor 16, the control signal E is transmitted to the capacitor judging circuit 22. Moreover, in the load state judging circuit 24, if the load current IL is judged to be less than the load current threshold value ITH, a control signal H is transmitted to the capacitor judging circuit 22. The capacitor judging circuit 22, based on the control signals E and H, generates the control signal J and transmits it to the switch selecting circuit 21.

Based on the control signal J, the control signal M is transmitted from the switch selecting circuit 21 to the switch driving circuit 20, from which an active mode driving signal Q is output, as a result, causing the COM terminal and the contact c1 of the switch 15 to be put into an ON state. Moreover, based on the control signal J, the control signal K is transmitted from the switch selecting circuit 21 to the switch driving circuit 19, from which an active mode driving signal P is output and, as a result, causing the COM terminal and the contact b1 of the switch 14 to be put into an ON state.

By the above operations, connection is established among the switches 13, 14, and 15. That is, according to a state of the switch 13, the load L is connected to the chemical battery cell 11. According to a state of the switch 14, the capacitor 16 is charged at a specified value of a current fed from the chemical battery cell 11 through the constant current/constant voltage charging circuit 12. According to a state of the switch 15, the capacitor 17 is charged at a specified value of a current fed from the chemical battery cell 11 through the constant current/constant voltage charging circuit 12. The chemical battery cell 11 feeds energy used to drive a small load whose load current is less than the load current threshold value ITH to the load L and is discharged at a specified value of a current to re-charge the capacitors 16 and 17 and, as a result, the voltage value A of the chemical battery cell 11 drops due to the specified internal impedance 11a therein and is changed to be the capacitor charged voltage+small load discharged voltage VL occurred by a voltage drop from non-load voltage V0. The capacitors 16 and 17 are re-charged by the chemical battery cell 11 which causes the terminal voltage values C and D to be increased.

(7) Control Method at Time t14

At the time t14, the chemical battery cell 11 is in a state in which charging energy is stored, the capacitor 16 is in a state in which it has been charged so as to have a specified voltage value (that is, in a state in which charging has been completed), the capacitor 17 is in a middle course of being charged, and the load L has started a third load burst. When the load L starts its third load burst, the load current detecting circuit 25 detects that the load current IL is more than the load current threshold value ITH and the control signal F is transmitted to the load state judging circuit 24. In the load state judging circuit 24, a state of the load current IL is judged based on the control signal F. Then, if the load current IL is more than the load current threshold value ITH, the control signal G used to put the switch 13 into an OFF state is transmitted from the load state judging circuit 24 to the switch driving circuit 18. This causes the switch 13 to be put into an OFF state.

The capacitor 16 is in a state in which charging has been completed while the capacitor 17 is in a middle course of being charged at a specified value of a current fed from the chemical battery cell 11 through the constant current/constant voltage charging circuit 12. The charged voltage VCap10 of the capacitor 16 is compared with the voltage VCap22 (which is an intermediate voltage between the charged voltage VCap20 and the discharged voltage VCap21) of the capacitor 17 by the capacitor voltage detecting circuit 23 and a signal indicating a result from the comparison is transmitted as the control signal E to the capacitor judging circuit 22. At the time t14, for example, if, in the capacitor voltage detecting circuit 23, the voltage value C of the capacitor 16 is judged to be higher than the voltage value D of the capacitor 17, the control signal E is transmitted to the capacitor judging circuit 22. Moreover, in the load state judging circuit 24, if the load current IL is judged to be more than the load current threshold value ITH, the control signal H is transmitted to the capacitor judging circuit 22. The capacitor judging circuit 22, based on the control signals E and H, generates the control signal J and transmits it to the switch selecting circuit 21.

Based on the control signal J, the control signal K is transmitted from the switch selecting circuit 21 to the switch driving circuit 19, from which a non-active mode driving signal P is output, thus causing the COM terminal and the contact b2 of the switch 14 to be put in an ON state. Moreover, based on the control signal J, the control signal M is transmitted from the switch selecting circuit 21 to the switch driving circuit 20, from which an active mode driving signal Q is output, thus causing the COM terminal and the contact c1 of the switch 15 to be put in an ON state.

By the above operations, connection is established among the switches 13, 14, and 15. That is, according to a state of the switch 13, the chemical battery cell 11 is disconnected from the load L. According to a state of the switch 14, the capacitor 16 is connected to the load L. According to a state of the switch 15, the capacitor 17 is charged at a specified value of a current fed from the chemical battery cell 11 through the constant current/constant voltage charging circuit 12. Since the chemical battery cell 11 is disconnected to the load L and since the capacitor 17 is in a middle of being charged, the voltage A of the chemical battery cell 11 drops due to an internal impedance 11a therein and is changed to be a capacitor charging time voltage VChg occurred by a voltage drop from non-load voltage V0. The capacitor 16, since it is connected to the load L, starts a supply of electric energy to the load L. The capacitor 17 is in a middle of being charged which causes the voltage value D of the capacitor 17 to be increased.

As shown in the above processes (1) to (7), in the power supply circuit of the embodiment, while the capacitors 16 and 17 are in a state in which they are not yet charged, by operations occurring during a period from the time t0 to the time t1, an initial environment for circuit operations is prepared and thereafter, in synchronization with a period of the load burst, an operation having a period from the time t10 to the time t14 as one operational period is repeated.

Thus, according to the power source circuit of the first embodiment, during a load burst period in an odd-numbered order, the load L is driven by power accumulated in the capacitor 16 and, during a load burst period in an even-numbered order, the load L is driven by power accumulated in the capacitor 17, even if a duty ratio of the load burst period in one period during which the load burst period occurs intermittently exceeds 50%, energy required during the load burst period is fed from the capacitor 16 or the capacitor 17 and the chemical battery cell 11 does not discharge during the load burst period. Therefore, an amount of a voltage A having dropped due to the specified internal impedance 11*a* of the chemical battery cell 11 becomes small and, as a result, when the power source circuit of the first embodiment is applied to an electronic device which becomes inoperable due to a temporary voltage drop in the power source, an operational life of the chemical battery cell 11 is made longer.

Second Embodiment

Figure 3:
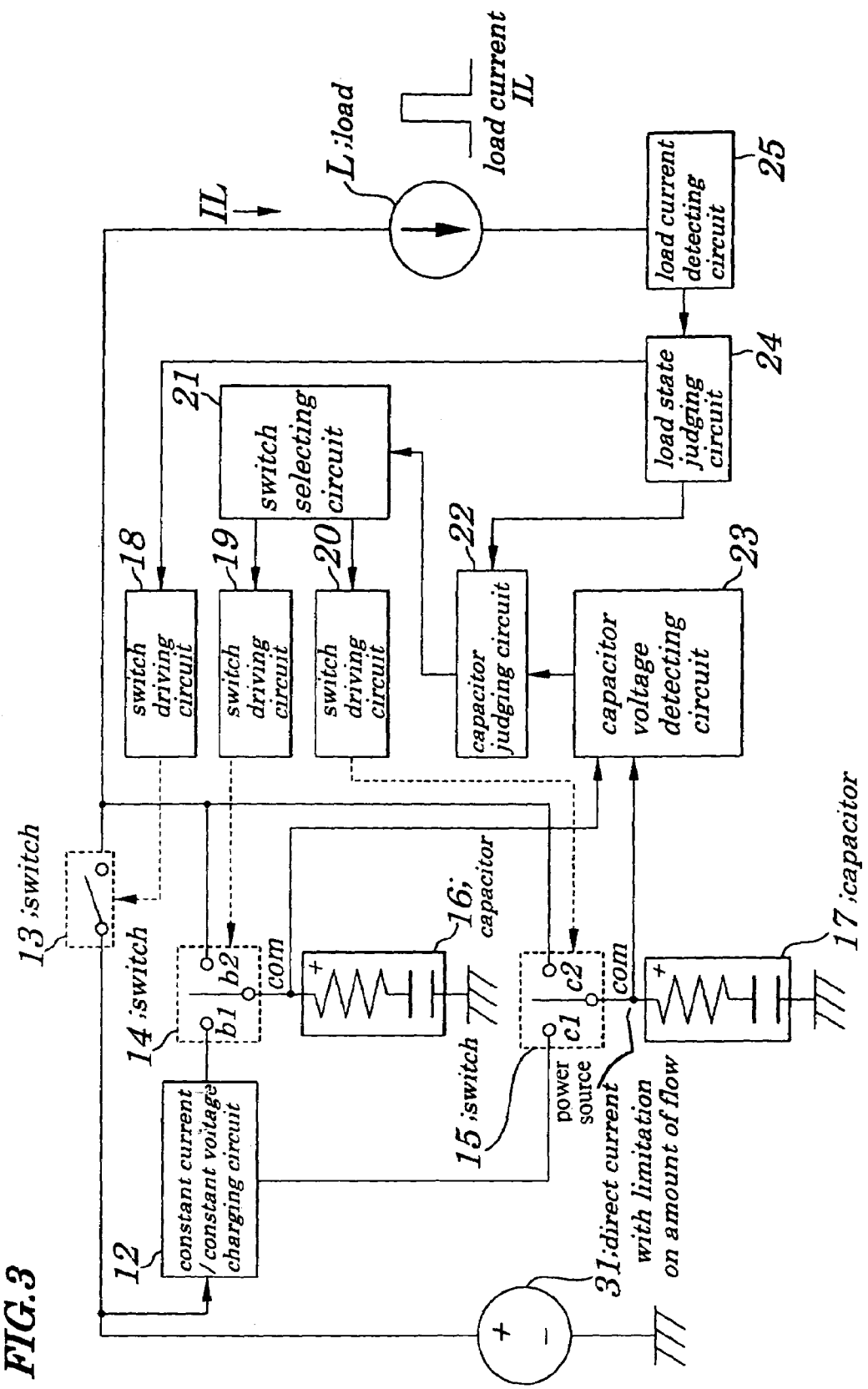
FIG. 3 is a schematic block diagram showing electrical configurations of a power source circuit according to a second embodiment of the present invention.

FIG. 3 is a schematic block diagram showing electrical configurations of a power source circuit according to a second embodiment of the present invention. In FIG. 3, same reference numbers are assigned to parts having same functions as those used in the first embodiment as shown in FIG. 1 and their descriptions are omitted accordingly. In the power source circuit of the second embodiment, instead of a chemical battery cell 11 shown in FIG. 1, a direct current power source 31 is newly provided. The direct current power source 31 is made up of a direct current stabilized power source having a current limiting function, DC-DC converter, or a like, in which a maximum output current is limited to a specified value. Components other than the direct current power source 31 are the same as those in FIG. 1.

The power source circuit of the second embodiment differs from those employed in the first embodiment in that capacitors 16 and 17 are charged by a current output from the direct current power source 31.

Therefore, a load L, even if a load current IL is more than a current limited by the direct current power source 31, receives a current from the capacitors 16 and 17 and is driven without failure.

Thus, according to the power source circuit of the second embodiment, since the capacitors 16 and 17 are charged by a current output from the direct current power source circuit 31, even if the load current IL is more than a limited current for the direct current power source circuit 31, the load L is driven without failure. This enables the direct current power source 31 to be miniaturized. This is also an advantage that can be added to that obtained in the first embodiment.

Third Embodiment

Figure 4:
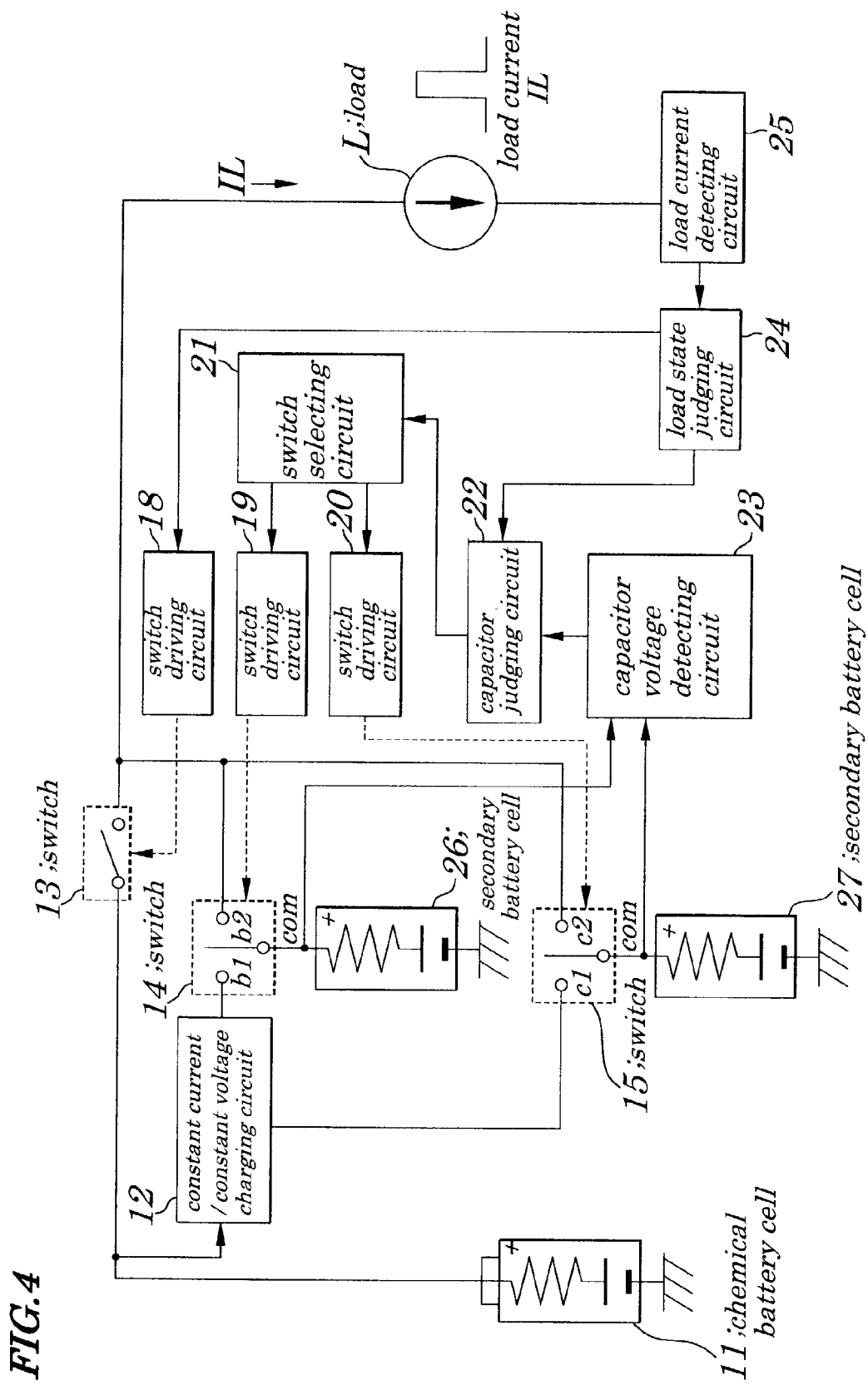
FIG. 4 is a schematic block diagram showing electrical configurations of a power source circuit according to a third embodiment of the present invention.

FIG. 4 is a schematic block diagram for showing electrical configurations of a power source circuit according to a third embodiment of the present invention. In FIG. 4, same reference numbers are assigned to parts having same functions as those used in the first embodiment as shown in FIG. 1 and their descriptions are omitted accordingly. In the power source circuit of the third embodiment, instead of the capacitors 16 and 17 as shown in FIG. 1, secondary battery cells 26 and 27 such as nickel cadmium cells, nickel hydrogen cells, and lithium ion cells are placed. Components other than these are the same as those shown in FIG. 1.

In the power source circuit of the embodiment, the same operations as in the first embodiment are performed and the same advantages as those obtained in the first embodiment can be achieved.

Fourth Embodiment

Figure 5:
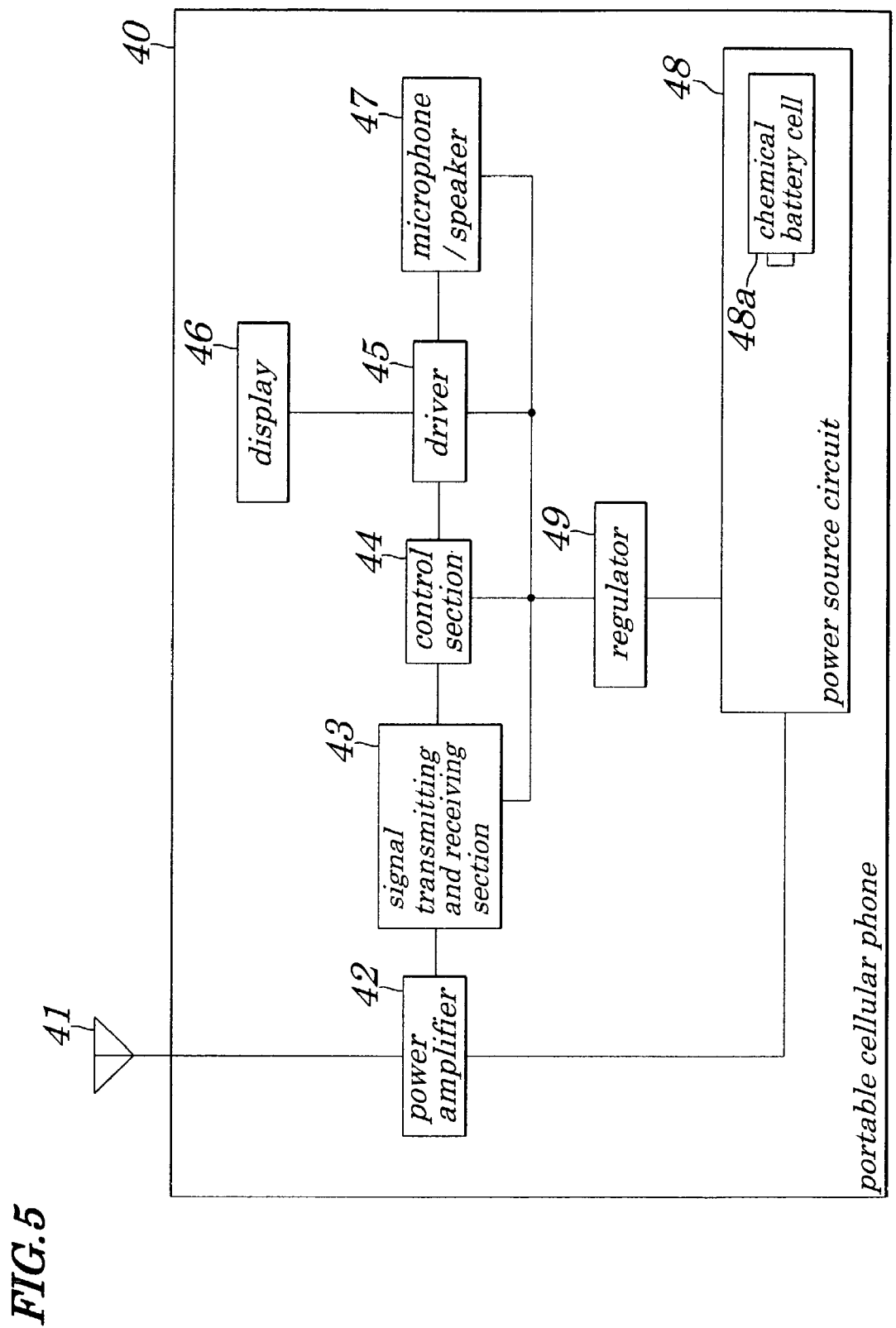
FIG. 5 is a schematic block diagram showing electrical configurations of an electronic device according to a fourth embodiment of the present invention.

FIG. 5 is a schematic block diagram for showing electrical configurations of an electronic device according to a fourth embodiment of the present invention. The electronic device of the embodiment, as shown in FIG. 5, relates to a portable cellular phone 40, which includes an antenna 41, a power amplifier 42, a signal transmitting and receiving section 43, a control section 44, a driver 45, a display 46, a microphone/speaker 47, a power source circuit 48, and a regulator 49. The power amplifier 42 transmits a signal output from the signal transmitting and receiving section 43 as an electromagnetic wave for signal transmission in accordance with a TDMA (Time Division Multiple Access) method. As the TDMA method, a PDC (Personal Digital Cellular) method is employed in Japan and a GSM (Global System for Mobile communication) method is employed in Europe.

The signal transmitting and receiving section 43 transmits and receives a wireless signal through the antenna 41. The control section 44 is made up of a CPU (Central Processing Unit) or a like and controls operations of the entire portable cellular phone 40 based on a control program. The driver 45 converts a voice signal provided from the microphone/speaker 47 to a digital signal and also converts a received digital signal to a voice signal and then transmits it to the microphone/speaker 47. Moreover, the driver 45 transmits a signal for display to the display 46. The display 46 displays information about various messages required by a user. The power source circuit 48 is made up of a chemical battery cell 48*a* and has same configurations as those employed in the first embodiment shown in FIG. 1 and feeds an output voltage to the power amplifier 42. The regulator 49 receives an output voltage from the power source circuit 48 and outputs a constant voltage having a specified value to the signal transmitting and receiving section 43, the control section 44, the driver 45, and the microphone/speaker 47.

The portable cellular phone 40 transmits an electromagnetic wave for signal transmission in accordance with the TDMA method. At this point, a pulse-like load current having a frequency formed in accordance with the TDMA method is taken from the power source circuit 48. Since the power source circuit 48 has same configurations as those employed in the first embodiment in FIG. 1, even if a load current flowing through the power amplifier 42 increases instantaneously, no drop in voltage occurs in the chemical battery cell 48*a*. Therefore, as in the case of the first embodiment, even in the case where a life of the chemical battery cell 48*a* is judged based on a decrease in voltage, there occurs no case in which the chemical battery cell 48*a* is judged to be at an end of its life in a state in which discharging depth is small, as a result, an efficiency of using energy of the chemical battery cell 48*a* is improved. Moreover, even if a duty ratio during a load burst period is more than 50%, energy required during the load burst period is supplied from the capacitor 16 or the capacitor 17 shown in FIG. 1. That is, the same effect as obtained in the first embodiment can be achieved in the fourth embodiment.

Fifth Embodiment

Figure 6:
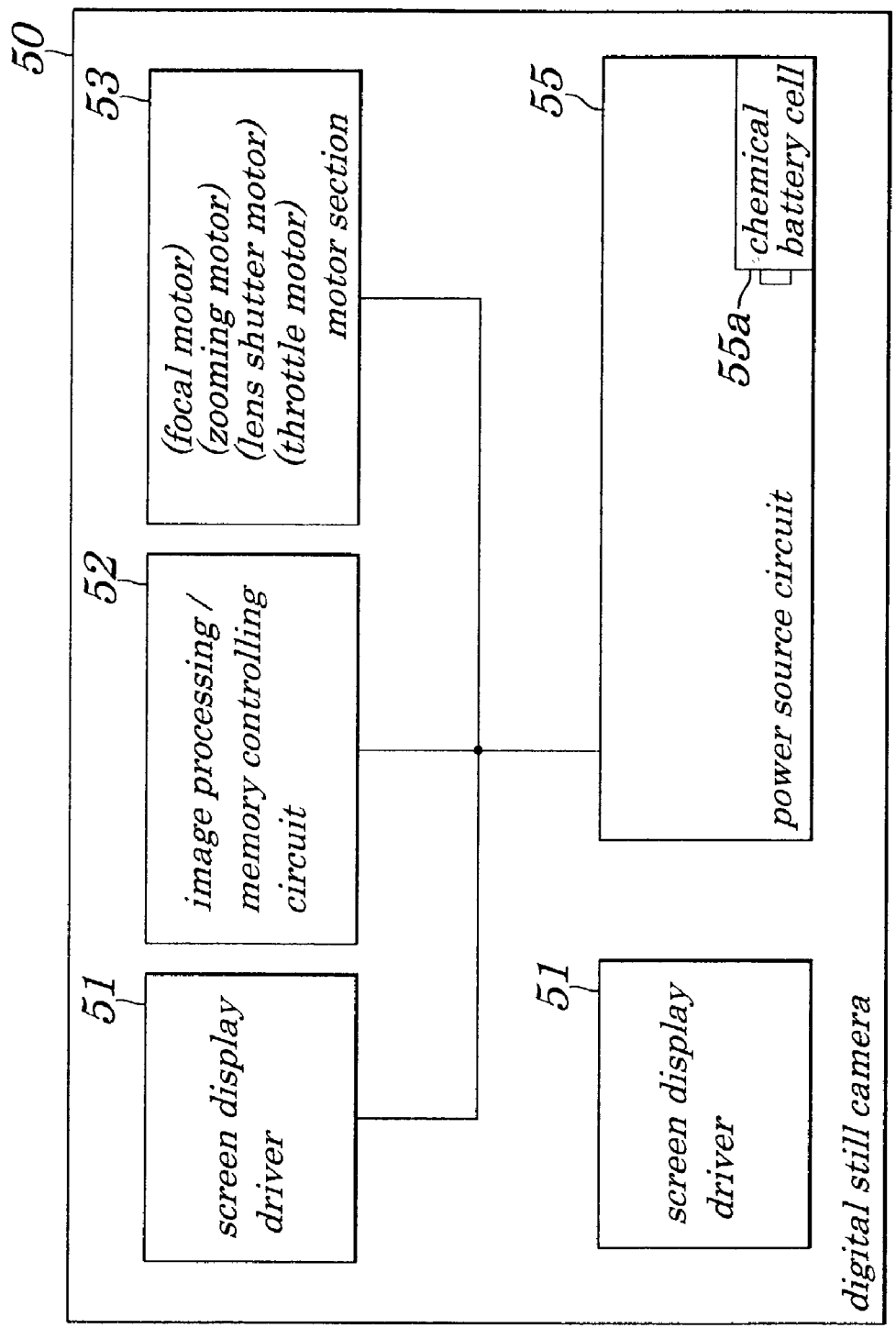
FIG. 6 is a schematic block diagram showing electrical configurations of an electronic device according to a fifth embodiment of the present invention.
Figure 7:
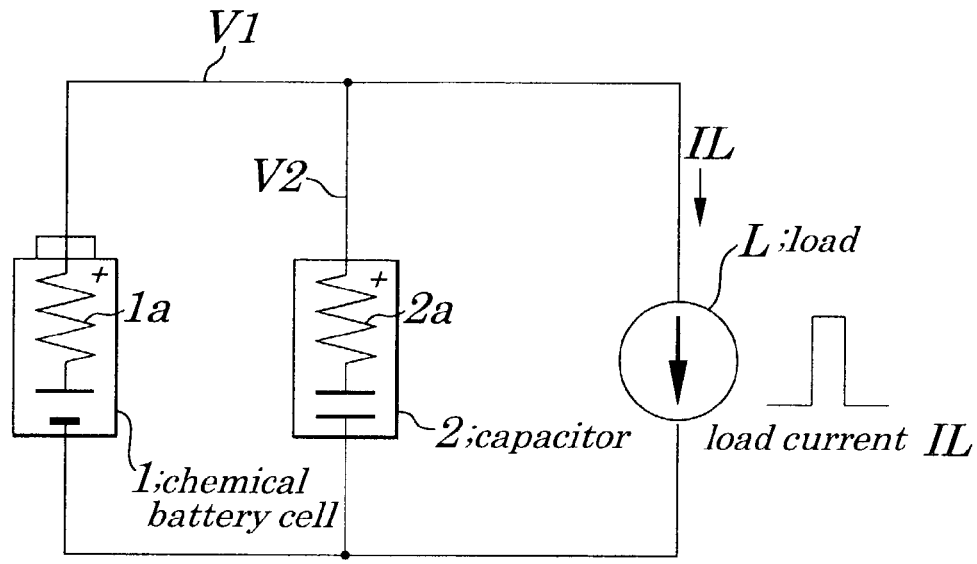
FIG. 7 is a circuit diagram of a conventional power source circuit.
Figure 8:
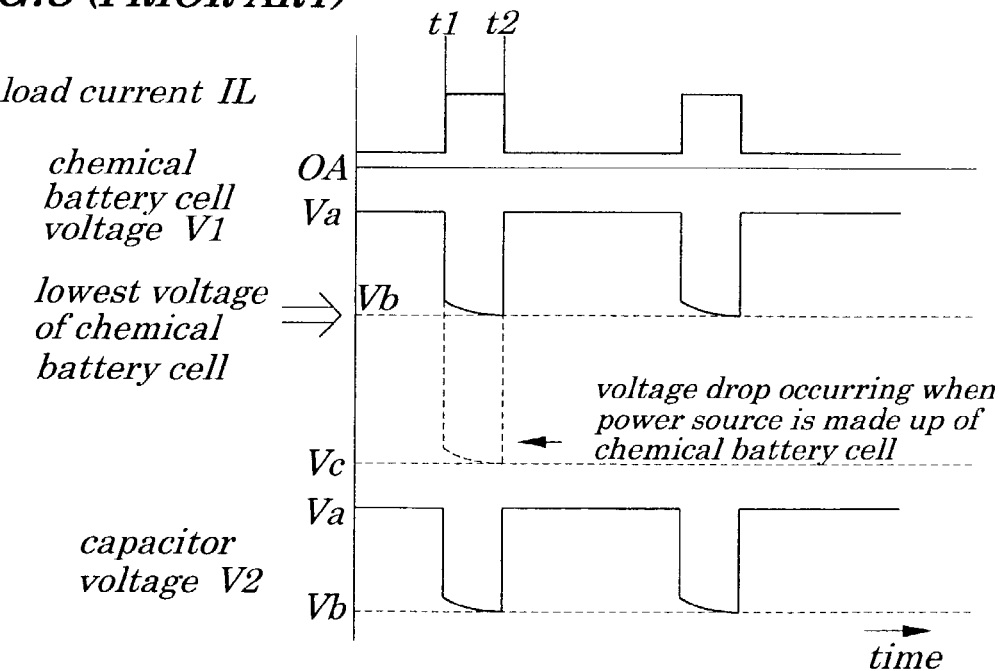
FIG. 8 is a timing chart of signals explaining an operation of the conventional power source circuit of FIG. 7.

FIG. 6 is a schematic block diagram for showing electrical configurations of an electronic device according to a fifth embodiment of the present invention. The electronic device of the embodiment, as shown in FIG. 6, relates to a digital still camera 50, which includes screen display drivers 51, an image processing/memory controlling circuit 52, a motor section 53, a strobe light emission control section (not shown), and a power source circuit 55. The screen display driver 51 transmits image data obtained by the digital still camera 50 to a display device (not shown) such as a display of a personal computer (not shown). The image processing/memory controlling circuit 52 performs specified processing on the image data obtained by the digital still camera 50 and stores the processed data in a memory or a like (not shown). The motor section 53 includes a focal motor, zooming motor, lens shutter motor, throttle motor, or a like. The strobe light emission control section causes a strobe (not shown) to emit light. The power source circuit 55 is made up of a chemical battery cell 55a and has the same configurations as that employed in the first embodiment and feeds an output voltage to the screen display driver 51, image processing/memory controlling circuit 52, motor section 53, and strobe light emission control section.

In the digital still camera 50, when any one of the image processing/memory controlling circuit 52, motor section 53, and strobe light emission control section is operated, a large load current is instantaneously taken from the power source circuit 55. Since the power source circuit 55 has the same configurations as those employed in the first embodiment shown in FIG. 1, even if a load current increases instantaneously, no drop in voltage of the chemical battery cell 55a occurs.

As described above, in the fifth embodiment, since the power source circuit 55 has the same configurations as those employed in the first embodiment, even if a load current flowing through the screen display driver 51, image processing/memory controlling circuit 52, motor section 53, and strobe light emission control section increase instantaneously, the voltage of the chemical battery cell 55a does not drop. Therefore, as in the case of the first embodiment, even in the case where a life of the chemical battery cell 55a is judged based on a decrease in voltage, there occurs no case in which the chemical battery cell 55a is judged to be at an end of its life in a state in which discharging depth is small and, as a result, an efficiency of using energy of the chemical battery cell 55a is improved. Moreover, even if a duty ratio during a load burst period is more than 50%, since energy required during the load burst period is supplied from a capacitor 16 or a capacitor 17 shown in FIG. 1, the same effect as obtained in the first embodiment can be achieved.

It is apparent that the present invention is not limited to the above embodiments but may be changed and modified without departing from the scope and spirit of the invention. For example, the number of power storing sections such as the capacitor 16 or the capacitor 17 shown in FIG. 1 or such as secondary cells 26 and 27 shown in FIG. 4 is not limited to two pieces and it may be three or more, by configuring so that an arbitrary one of the power storing sections that have been already charged is selected by the control section. The present invention may be applied not only to the power source circuit for portable cellular phones, digital still cameras, or a like, but also to an entire power source circuit for electronic devices in which power consumption intermittently changes or for electronic devices through which a large amount of a load current flows at time of an operational start of these devices.

What is claimed is:

1. A power source circuit for supplying power to a load to be driven, in which a load burst period during which a large amount of a load current flows and a small current period during which a small amount of the load current flows alternately occur, comprising:
a power supplying section to generate an electromotive force;
a plurality of power storing sections to be charged by said electromotive force fed from said power supplying section and to accumulate power; and
a control section to select, during said load burst period, an arbitrary one of said power storing sections that have been already charged and to feed only power that has been accumulated in the selected power storing section to said load, and to feed, during said small current period, power only from said power supplying section to said load, and to charge a power storing section that has not yet been charged, even during said load burst period and even during said small current period.

2. A power source circuit for supplying power to a load comprising:
a power supplying section to generate an electromotive force;
a first power storing section to be charged by an electromotive force fed from said power supplying section and to accumulate power;
a second power storing section to be charged by an electromotive force fed from said power supplying section and to accumulate power; and
a control section to feed only power accumulated in said first power storing section during the load burst period in an odd-numbered order out of said load burst periods to said load and to feed only power accumulated in said second power storing section during the load burst period in an even-numbered order out of said load burst periods, and to feed, during said small current period, power only from said power supplying section to said load.

3. A power source circuit for suppling power to a load in which load burst periods intermittently occurs during each of which a load current increases and decreases in a burst manner comprising:
a power supplying section to generate an electromotive force and to feed it to said load;
a first power storing section to be charged by an electromotive force fed from said power supplying section and to accumulate power;
a second power storing section to be charged by an electromotive force fed from said power supplying section and to accumulate power; and
a control section to feed only power accumulated in said first power storing section during the load burst period in an odd-numbered order out of said load burst periods to said load and to feed only power accumulated in said second power storing section during the load burst period in an even-numbered order out of said load burst periods,
wherein said control section comprises:
a load state monitoring circuit to monitor a load current flowing through said load and to output, based on a result from the monitoring, a signal representing information about occurrence of a load burst period showing production of said load burst period;
a power storing section monitoring circuit to monitor a voltage of said first power storing section and a voltage of said second power storing section and to output, based on a result from the monitoring, a signal representing information about charging and discharging showing a state of charging and discharging in said first power storing section and said second power storing section; and
a power supply controlling circuit to input said information about occurrence of a load burst period and said information about a state of charging and discharging and, to feed, during said load burst period in said odd-numbered order out of said load burst periods, only power accumulated in said first power storing section that has been already charged to said load and to charge said second power storing section that has not been charged and to feed, during said load burst period in said even-numbered order out of said load burst periods, only power accumulated in said second power storing section that has been charged to said load and to charge said first power storing section that has not been charged.

4. The power source circuit according to claim 3, wherein each of said first and second power storing sections has at least capacity capable of feeding required power to said load during one load burst period.

5. The power source circuit according to claim 3, wherein said power supplying section is made up of a chemical battery cell or a direct current power source whose maximum output current is limited to a specified current value and wherein each of said first and second power storing sections is made up of an electric double-layer capacitor or a secondary battery cell.

6. A power source circuit for supplying power to a load in which load burst periods intermittently occurs during each of which a load current increases and decreased in a burst manner comprising:
   a power supplying section to generate an electromotive force and to feed it to said load;
   a first power storing section to be charged by an electromotive force fed from said power suppling section and to accumulate power;
   a second power storing section to be charged by an electromotive force fed from said power supplying section and to accumulate power; and
   a control section to feed only power accumulated in said first power storing section during the load burst period in an odd-numbered order out of said load burst periods to said load and to feed only power accumulated in said second power storing section during the load burst period in an even-numbered order out of said load burst periods,
   wherein said control section comprises:
   a load state monitoring means to monitor a load current flowing through said load and to output, based on a result from the monitoring, a signal representing information about occurrence of a load burst period showing production of said load burst period;
   a power storing section monitoring means to monitor a voltage of said first power storing section and a voltage of said second power storing section and to output, based on a result from the monitoring, a signal representing information about charging and discharging showing a state of charging and discharging in said first power storing section and said second power storing section; and
   a power supply controlling means to input said information about occurrence of a load burst period and said information about a state of charging and discharging and, to feed, during said load burst period in said odd-numbered order out of said load burst periods, only power accumulated in said first power storing section that has been already charged to said load and to charge said second power storing section that has not been charged and to feed, during said load burst period in said even-numbered order out of said load burst periods, only power accumulated in said second power storing section that has been charged to said load and to charge said first power storing section that has not been charged.

7. A method for controlling a power source circuit for supplying power to a load to be driven, in which a load burst period during which a large amount of a load current flows and a small current period during which a small amount of the load current flows alternately occur, said method comprising:
   a step of placing a power supplying section to generate an electromotive force and to feed it to a load, a first power storing section to be charged by an electromotive force generated by said power supplying section, and to accumulate power and to feed the accumulated power to said load, and a second power storing section to be charged by an electromotive force generated by said power supplying section, and to accumulate power and to feed the accumulated power to said load; and
   a step of feeding, during said load burst period, an arbitrary one of said power storing sections that have been already charged and to feed only power that has been accumulated in the selected power storing section to said load, and to feed, during said small current period, power only from said power supplying section to said load, and to charge a power storing section that has not yet been charged, even during said load burst period and even during said small current period.

8. A method for controlling a power source circuit for supplying power to a load, said method comprising:
   a process of placing a power supplying section to generate an electromotive force and to accumulate power, a first power storing section to be charged by an electromotive force fed from said power supplying section, to accumulate power and to feed the accumulated power supplied by said power supplying section to said load, and a second power storing section to be charged by an electromotive force supplied by said power supplying section and to accumulate power;
   a process of monitoring a load state to monitor a load current flowing through said load and to output, based on a result from the monitoring, a signal representing information about occurrence of said load burst period showing production of said load burst period;
   a process of monitoring a power storing section to monitor a voltage of said first power storing section and a voltage of said second power storing section and to output, based on a result from the monitoring, a signal representing information about charging and discharging showing a state of charging and discharging in said first power storing section and said second power storing section;
   a first process of supplying power to input said information about occurrence of said load burst period and information about a state of charging and discharging and to feed, during a load burst period in an odd-numbered order out of said load burst periods, only power accumulated in said first power storing section that has been already charged to said load and to charge said second power storing section that has not been charged; and
   a second process of supplying power to feed, during a load burst period in an even-numbered order out of said load burst periods, only power accumulated in said second power storing section that has been charged to said load and to charge said first power storing section that has not been charged; and to feed, during said small current period, power only from said power supplying section to said load.

9. An electronic device being equipped with a power source circuit for supplying power to a load to be driven, in which a load burst period during which a large amount of a load current flows and a small current period during which a small amount of the load current flows alternately occur, said power source circuit comprising:
   a power supplying section to generate an electromotive force;
   a plurality of power storing sections to be charged by said electromotive force fed from said power supplying section and to accumulate power; and
   a control section to select, during said load burst period, an arbitrary one of said power storing sections that have been already charged and to feed only power that has been accumulated in the selected power storing section said load and to feed, during said small current period, power only from said power supplying section to said load, and to charge a power storing section that has not yet been charged, even during said load burst period and even during said small current period.

10. The electronic device according to claim 9, further comprising a part of a portable cellular phone.

11. The electronic device according to claim 9, further comprising a part of a digital still camera.

12. An electronic device being equipped with a power source circuit for supplying power to a load to be driven, in which a load burst period during which a large amount of a load current flows and a small current period during which a small amount of the load current flows alternately occur, said power source circuit comprising:
   a power supplying section to generate an electromotive force;
   a first power storing sections to be charged by an electromotive force fed from said power supplying section and to accumulate power;
   a second power storing sections to be charged by an electromotive force fed from said power supplying section and to accumulate power; and
   a control section to feed only power accumulated in said first power storing section during a load burst period in an odd-numbered order out of said load burst periods to said load and to feed only power accumulated in said second power storing section during the load burst period in an even-numbered order out of said load burst periods, and to feed, during said small current period, power only from said power supplying section to said load.

13. The electronic device according to claim 12, further comprising a part of a portable cellular phone.

14. The electronic device according to claim 12, further comprising a part of a digital still camera.

* * * * *